Feb. 1, 1949.       N. IVANOVIC       2,460,292
VIBRATION INSULATING MOUNTING
Filed Aug. 1, 1945
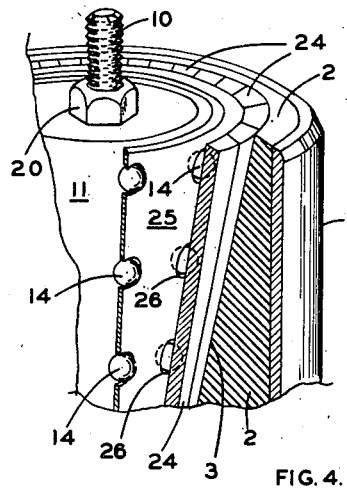
FIG. 4.
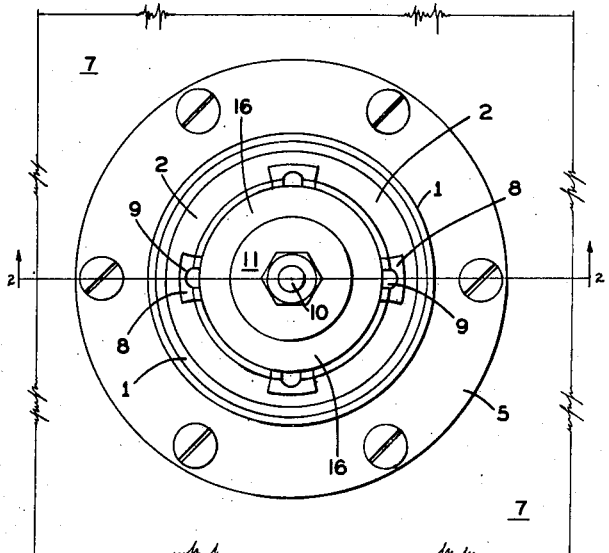
FIG. 1.
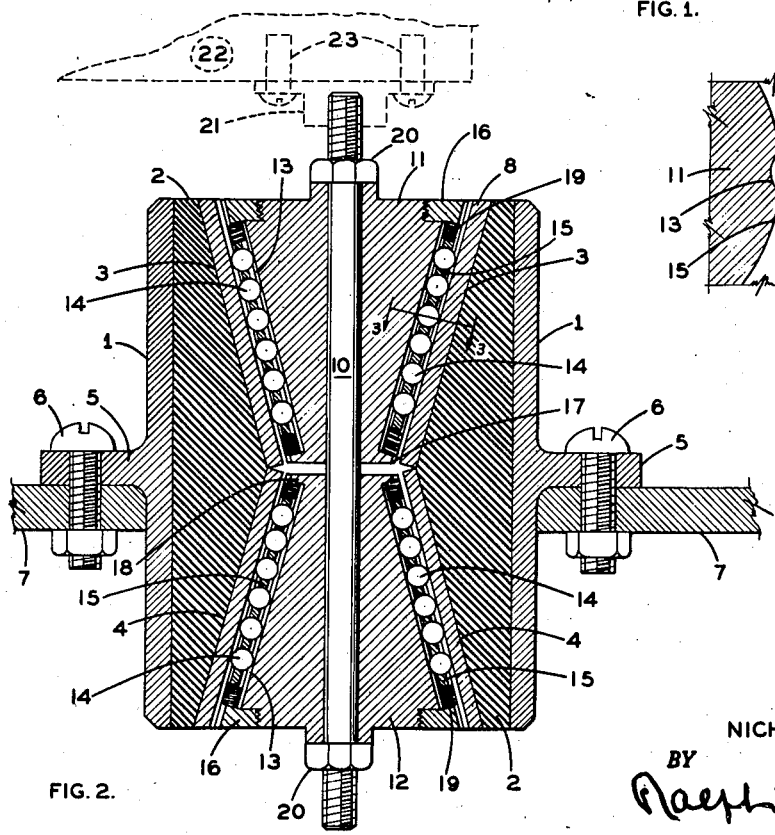
FIG. 2.
FIG. 3.
INVENTOR.
NICHOLAS IVANOVIC.
BY
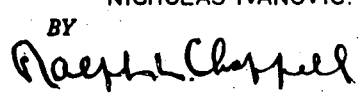
ATTORNEY Patented Feb. 1, 1949

2,460,292

UNITED STATES PATENT OFFICE 2,460,292

VIBRATION INSULATING MOUNTING

Nicholas Ivanovic, Philadelphia, Pa.

Application August 1, 1945, Serial No. 608,341

14 Claims. (Cl. 248—358)

(Granted under the act of March 3, 1883, as amended April 30, 1928; 370 O. G. 757)

This invention relates to new and useful improvements in vibration insulating structures and more particularly, to vibration insulators especially adapted for use in environments wherein substantial vibrations occur.

In many instances, it is desirable or necessary to shock-mount or vibrationally insulate from their supporting structures, various types of instruments, radio equipment, engines, motors, and numerous other devices, and, with this in mind, it is the principal object of the present invention to provide a novel vibration insulator mounting that is operable to provide substantially uniform vibration insulation in all directions.

Another object of the invention is to provide a novel vibration insulator of the stated character which may be mounted in any plane or position without affecting operation thereof, and which is further characterized by rotational freedom where desired.

Another object of the invention is to provide a novel vibration insulator as set forth wherein the deflection and spring rate of the insulator may be controlled as desired.

A further object of the invention is to provide a novel vibration insulator of the type described which may be readily adapted to both high and low static load conditions.

Still a further object of the invention is to provide a novel vibration insulator having the features and characteristics set forth which is operable to provide superior vibration insulation characteristics in installations where the amplitude of the vibration impulse is of large magnitude.

A still further object of the present invention is to provide a vibration insulator as set forth which is of relatively simplified and rugged construction, comparatively inexpensive to manufacture and highly efficient in use and operation.

These and other objects of the invention, and the various features and details of the construction, operation and use thereof, are hereinafter fully set forth and described with reference to the accompanying drawing, in which:

Fig. 1 is a view in plan of a vibration insulator embodying the present invention.

Fig. 2 is an enlarged sectional view taken on line 2—2, Fig. 1.

Fig. 3 is an enlarged sectional view taken on line 3—3, Fig. 2; and

Fig. 4 is a fragmentary perspective view partially in section illustrating a modified form of the present invention.

Referring now to the drawing, a vibration insulator made according to the present invention comprises a fixed supporting structure including an outer ring or annular support 1, and an inner annular load support member 2 having angularly disposed substantially frusto-conical inner surface portions 3 and 4, respectively, that flare outwardly in respectively opposite directions endwise of the support 1. In the illustrated embodiment of the invention, the annular ring or support 1 is provided with an integral flange portion 5 that projects laterally outward therefrom and is provided with a series of openings for the reception of bolts, screws, or other suitable fasteners 6 by means of which the supporting structure may be fixedly secured or anchored to a part 7 of a structure with respect to which an article is to be mounted and vibrationally insulated by the device of the present invention.

The inner load supporting member 2 is fabricated of resilient material, such as, for example, rubber or the like, and secured and mounted in the inner angularly disposed surface portions 3 and 4, thereof, are elongated race members 8 which extend lengthwise of the said member 2 as shown, at predetermined spaced intervals circumferentially thereof, for example, at 90° intervals as indicated in Fig. 1 of the drawing. These race members 8 preferably are composed of metal or other material of suitable hardness, and formed longitudinally and lengthwise in the inner faces thereof are grooves or channels 9 having a substantial arcuate cross-section shape or configuration of predetermined radius.

Disposed substantially coaxially within the fixed supporting structure hereinbefore described is a floating support assembly which comprises an axial rod or shaft 10 on which is mounted upper and lower frusto-conical load support members 11 and 12, respectively. These frusto-conical load support members 11 and 12 may be composed of resilient or non-resilient material as desired, and are mounted on the rod or shaft 10 in the general relation shown in Fig. 2 of the drawing so that the angularly disposed lateral surfaces thereof are arranged in correspondence to the angularly disposed surface portions 3 and 4 of the member 2 and its race inserts 8. Lengthwise in the lateral annular surfaces of the frusto-conical members 11 and 12 and adapted to be positioned in opposing or confronting relation with respect to the grooves or channels 9 in the race inserts 8 of the fixed support structure, there may be formed grooves or channels 13 likewise of arcuate cross-section shape and having a radius which is the same as the radius of the arcuate grooves or channels 9 in the aforesaid race inserts 8 of the fixed support structure, although the provision of such grooves or channels 13 in said member 11 and 12 is not essential to efficient operation of the device.

The floating support assembly comprising the rod 10 and the frusto-conical supports 11 and 12 is supported with respect to the fixed support structure by means of a series of non-resilient spherical elements 14 composed for example, of steel or other material of suitable hardness, which are disposed intermediate the adjacent angularly disposed surface portions of the fixed and floating supports in engagement with the corresponding pairs of grooves or channels 9 and 13 formed respectively in the inserts 8 of the fixed support structure and in the lateral surface of the support members 11 and 12 of the floating support assembly, for example, as more clearly illustrated in Fig. 3 of the drawing. Of course, in the event the channels or grooves 13 in the members 11 and 12 are omitted, the spherical elements 14 will engage the continuous lateral surfaces of said members 11 and 12. The several spherical elements 14 of each series are maintained in relatively spaced relation with respect to one another lengthwise intermediate the fixed and floating supports by means of suitable spacers 15 which extend lengthwise therebetween and are provided therein with suitable openings in which the spherical elements 14 are disposed for example, as best shown in Figs. 2 and 3 of the drawing.

The respective series of spherical elements and their associated spacers 15 are retained in the desired relationship intermediate the fixed supporting structure and the floating support assembly against displacement outwardly endwise thereof by means of annular collar members 16 which are threaded on the outer ends of the load support members 11 and 12 of the floating assembly, and the inner ends of the said members 11 and 12 are provided with substantially radially extending flange portions 17 and 18, respectively, against which the inner ends of the ball and spacer assemblies are adapted to seat in the manner shown in Fig. 2. Preferably, suitable resilient means, such as, for example, coil springs or the like 19 are interposed between the opposite ends of the spacer members 15 and the retainer rings 16 and flange portions 17 and 18, respectively, for the purpose of maintaining the spherical elements 14 and spacers 15 properly centered lengthwise between the fixed and floating supports. These springs 19 function also to permit free motion of the spacers 15 with their associated spherical elements 14, in an axial direction under load to compensate for the fact that travel of said spacers and their associated spherical elements is approximately only one-half the distance of any travel of the floating assembly in an axial direction.

The upper and lower floating load support members 11 and 12, together with the associated series of spherical elements 14 and spacers 15 are secured upon the rod or shaft 10 by means of nuts or like retaining elements 20 threaded upon the ends of the rod or shaft 10 by means of which the load support members 11 and 12 may be adjusted to vary the relative spacing thereof with respect to each other and thereby the relative positions of said members with respect to the angularly disposed inner surface portions 3 and 4 of the fixed supporting structure as desired, to provide the static compression therebetween that is required to meet the particular vibration insulating conditions of a given installation as more particularly described hereinafter.

A piece of equipment adapted to be vibrationally insulated, for example, from the structure or part 7 to which the fixed supporting structure of the insulator is shown as secured by means of bolts 6, may be connected or anchored in any suitable manner to the rod or shaft 10 of the floating support assembly. Thus, for example, there may be threaded upon the upper end of the rod or shaft 10 an annular flange member 21 to which a piece of equipment 22 may be fastened by screws or other suitable fasteners 23.

Vibration insulators constructed as herein described and embodying series of spherical elements cooperable between surfaces which are angularly disposed with respect to the axis of support of the insulator, provide a number of features that are unique in vibration insulation. Thus, a relative depression of the floating support assembly or structure relative to the fixed support structure produces two effects, to wit, a compression of the resilient member 2 due to radial forces exerted thereon, with accompanying energy absorption, and a relative downward movement of the floating support assembly which results in movement of the spherical element 14 in a downward direction with respect to the surfaces 3 and 4 of the load member 2 of the fixed support structure.

Such downward movements of spherical elements is a distinct aid to vibration insulation, since the total excursion or movement of the floating support structure with respect to the fixed support structure is the sum of three movements; namely compression of the resilient member 2, downward motion due to shear load, and movement due to rolling action of the spherical elements 14. This downward movement is variable and may be controlled easily and readily as desired by varying the durometer hardness of the resilient member 2, the depth or thickness of said member 2, the width of the race members 8, length of the race members 8, angle of disposition of surfaces, number of races employed, and the initial compression of the cushion by tightening or loosening the nuts 20 upon the rod 10 to the desired extent. Hence, by changing one or more of the variables just mentioned, it is possible to adjust the vibration characteristics of the present invention over a relatively wide range of spring constants varying from "soft" to "hard." This is an important feature in that in critical application, the vibration insulator may be adjusted to meet any given specific service conditions. Furthermore, the insulator of the present invention is characterized by an almost linear deflection versus load curve. However, by varying the angular disposition of the angular surfaces of the fixed and floating supports, it is possible to produce deflection curves that will satisfy substantially any vibration conditions, and the effect of this is to lighten the load/deflection curve, thereby increasing the total movement of the floating support member with a resulting "softening" of the vibration insulator.

Vibration insulators made in accordance with the present invention also embody unique characteristics of vibration insulation insofar as direction of load or vibration impulse is concerned. Thus, with respect to any load acting axially of the rod 10 of the floating support assembly, the vibration insulating characteristics of the insulator will be the same so long as the number of resilient elements, their size and hardness remain constant, and the vibration insulating qualities of the present insulator are equally effective against loads applied in a direction normal to the axis of the rod 10 or angularly with respect thereto.

In installations requiring rotational freedom between the floating support assembly and the fixed support structure, the modified form of construction shown in Fig. 4 of the drawing may be employed to advantage. Referring to Fig. 4, in the construction there illustrated, the relatively limited number of channelled race members 8 comprised in the device shown in Figs. 2 and 3 are eliminated, and replaced by a substantially continuous series of non-resilient race members 24 which are secured lengthwise to the angularly disposed inner surfaces 3 and 4 of the resilient member 2. It is to be noted that each of the race members 24 is wholly independent of the adjacent race members so that each such member may be urged outwardly individually to compress the resilient member 2 in accordance with the load forces exerted thereon by a particular one or more of the non-resilient spherical elements 14 disposed intermediate said race members 24 and the adjacent angular surfaces of the floating load support member 11.

In this form of the device shown in Fig. 4, the spherical elements 14 are maintained in properly spaced relation with respect to one another both lengthwise and circumferentially of the member 11 by means of a truncated conical sleeve member 25 having therein suitably located openings 26 in which the spherical elements 14 are disposed. The conical sleeve 25 extends continuously circumferentially of the member 11, intermediate the same and the series of race members 24 of the fixed support structure, and the thickness of said member 25 is less than the diameter of the spherical elements 14 so that the latter project beyond the opposite surfaces of the member 25 in rolling contact with the adjacent surfaces of the member 11 and race members 24. This construction permits of axial rotation of the floating support assembly relative to the fixed support structure, and this characteristic may be utilized to advantage to provide vibration insulating supports for rotating elements such as shafts, rods, spindles and the like. In all other respects an insulator device constructed as shown in Fig. 4 functions in the same manner as hereinbefore described with respect to the construction shown in Figs. 1, 2 and 3 of the drawing.

In still another embodiment of the invention, the race inserts 8 and 24, secured longitudinally with respect to the angularly disposed surfaces 3 and 4 of the member 2, may be entirely eliminated in which event the spherical elements 14 will bear directly upon the surfaces of the member 2. Furthermore, insulators embodying the present invention may be made and effectively employed which are constructed so as to embody, for example, only the upper or lower half portion of the vibration insulator constructions shown in the drawing as required by the conditions of a given installation.

From the foregoing it will be observed that the present invention provides a novel vibration insulator that is operable to provide substantial uniform vibration insulation in all directions, and which is constructed and arranged to provide for the ready and easy controllability of the spring rate and deflection characteristics of the insulator. The invention also provides a novel vibration insulator which may be mounted in any plane or position without effecting insulating characteristics thereof, and which may be readily adapted to both high and low static load conditions, and which is further characterized by the rotational freedom of the floating support member. Furthermore, the invention provides a novel vibration insulator which is operable to provide superior vibration insulation characteristics in installations where the amplitude of the vibration impulse is of large magnitude, and which is further characterized by its relatively simplified and rugged construction, comparatively low cost of manufacture, and high in efficiency in use and operation.

While certain embodiments of the present invention have been illustrated and described herein, it is not intended that the invention be limited to such disclosures, and changes and modifications may be made therein and thereto within the scope of the claims.

The invention described herein may be manufactured and used by or for the Government of the United States of America for governmental purposes without the payment of any royalties thereon or therefor.

I claim:

1. A vibration insulator comprising an annular fixed support structure having interiorly thereof an annular resilient member provided with angularly disposed annular surfaces extending in respectively opposite directions outwardly endwise of said fixed support structure, a plurality of non-resilient race members secured lengthwise of the angularly disposed surfaces of said resilient member, a floating support assembly disposed substantially coaxial within the said annular fixed support structure and having angularly disposed annular surfaces correspondingly associated with said angularly disposed surfaces of said annular resilient member of the said fixed support structure, and a plurality of non-resilient elements interposed between and in rolling contact with the angularly disposed surfaces of the float support and the non-resilient race members of the fixed support structure.

2. A vibration insulator comprising an annular fixed support structure having interiorly thereof an annular resilient member provided with angularly disposed annular surfaces extending in respectively opposite directions outwardly endwise of said fixed support structure, a plurality of non-resilient race members secured lengthwise of the angularly disposed surfaces of said resilient member, a floating support assembly disposed substantially coaxial within the said annular fixed support structure and having angularly disposed annular surfaces correspondingly associated with said angularly disposed surfaces of said annular resilient member of the said fixed support structure, a plurality of non-resilient elements interposed between and in rolling contact with the angularly disposed surfaces of the float support and the non-resilient race members of the fixed support structure, and spacer means associated with said non-resilient elements to maintain the same in predetermined spaced relation with respect to one another.

3. A vibration insulator comprising an annular fixed support structure having interiorly thereof an annular resilient member provided with angularly disposed annular surfaces extending in respectively opposite directions outwardly endwise of said fixed support structure, a plurality of non-resilient race members secured lengthwise of the angularly disposed surfaces of said resilient member, a floating support assembly disposed substantially coaxial within the said annular fixed support structure and having angularly disposed annular surfaces correspondingly associated with said angularly disposed surfaces of said annular resilient member of the said fixed support structure, a plurality of non-resilient elements interposed between and in rolling contact with the angularly disposed surfaces of the float support and the non-resilient race members of the fixed support structure, spacer means associated with said non-resilient elements to maintain the same in predetermined spaced relation with respect to one another, and means associated with said floating support assembly to retain said spacer members and non-resilient elements against displacement from cooperative engagement between the angular surfaces of the floating support and the race members of the fixed support structure.

4. A vibration insulator comprising an annular fixed support structure having interiorly thereof an annular resilient member provided with angularly disposed annular surfaces extending in respectively opposite directions outwardly endwise of said fixed support structure, a plurality of non-resilient race members secured lengthwise of the angularly disposed surfaces of said resilient member at predetermined equally spaced intervals circumferentially thereof, said race members having formed lengthwise in the faces thereof a channel of arcuate cross-section shape, a floating support assembly disposed substantially coaxial within said annular fixed support structure and including members providing angularly disposed annular surfaces correspondingly associated with said angularly disposed surfaces of the annular resilient member of the fixed support structure, and a plurality of non-resilient elements interposed between and in rolling contact with the angularly disposed surfaces of the floating support members and the arcuate channels in the non-resilient race members of the fixed support structure.

5. A vibration insulator comprising an annular fixed support structure having interiorly thereof an annular resilient member provided with angularly disposed annular surfaces extending in respectively opposite directions outwardly endwise of said fixed support structure, a plurality of non-resilient race members secured lengthwise of the angularly disposed surfaces of said resilient member at predetermined equally spaced intervals circumferentially thereof, said race members having formed lengthwise in the faces thereof a channel of arcuate cross-section shape having a predetermined radius, a floating support assembly disposed substantially coaxial within said annular fixed support structure and including members providing angularly disposed annular surfaces correspondingly associated with said angularly disposed surfaces of the annular resilient member of the fixed support structure, a plurality of non-resilient elements interposed between and in rolling contact with the angularly disposed surfaces of the floating support members and the arcuate channels in the non-resilient race members of the fixed support structure, and spacer means associated with said non-resilient elements to maintain the same in predetermined spaced relation with respect to one another lengthwise of the channels in said non-resilient race members.

6. A vibration insulator comprising an annular fixed support structure having interiorly thereof an annular resilient member provided with angularly disposed annular surfaces extending in respectively opposite directions outwardly endwise of said fixed support structure, a plurality of non-resilient race members secured lengthwise of the angularly disposed surfaces of said resilient member at predetermined equally spaced intervals circumferentially thereof, said race members having formed lengthwise in the faces thereof a channel of arcuate cross-section shape having a predetermined radius, a floating support assembly disposed substantially coaxial within said fixed support structure and including members providing angularly disposed annular surfaces correspondingly associated with said angularly disposed surfaces of the annular resilient member of the fixed support structure, a plurality of non-resilient elements interposed between and in rolling contact with the angularly disposed surfaces of the floating support members and the arcuate channels in the non-resilient race members of the fixed support structure, spacer means associated with said non-resilient elements to maintain the same in predetermined space relation with respect to one another lengthwise of the channels in said non-resilient race members, and means to vary the spacing between the angularly surfaced members of the floating support assembly in an axial direction to vary the static compression exerted thereby through said non-resilient elements and race members upon the resilient member of the fixed support structure.

7. A vibration insulator comprising an annular fixed support structure having interiorly thereof an annular resilient member t. .ned with angularly disposed annular surfaces x ending in respectively opposite directions outwardly endwise of said fixed support structure, a plurality of non-resilient race members secured lengthwise of the angularly disposed surfaces of said resilient member at predetermined equally spaced intervals circumferentially thereof, said race members having formed lengthwise in the faces thereof a channel of arcuate cross-section shape having a predetermined radius, a floating support assembly disposed substantially coaxial within said annular fixed support structure and including members providing angularly disposed annular surfaces correspondingly associated with said angularly disposed surfaces of the annular resilient member of the fixed support structure, a plurality of non-resilient elements interposed between and in rolling contact with the angularly disposed surfaces of the floating support members and the arcuate channels in the non-resilient race members of the fixed support structure, spacer means associated with said non-resilient elements to maintain the same in predetermined spaced relation with respect to one another lengthwise of the channels in said non-resilient race members, and means associated with said floating support assembly to retain said spacer members and non-resilient elements against displacement from between the float and fixed supports.

8. A vibration insulator comprising an annular fixed support structure having interiorly thereof an annular resilient member provided with angularly disposed annular surfaces extending in respectively opposite directions outwardly endwise of said fixed support structure, a plurality of non-resilient race members secured lengthwise of the angularly disposed surfaces of the said resilient member in substantially contiguous independent relation with respect to one another to provide substantially continuous non-resilient angular surfaces circumferentially of the angularly disposed surfaces of said resilient member, a floating support assembly disposed substantially coaxial within said annular fixed support structure and including members providing angularly disposed annular surfaces correspondingly associated with said angularly disposed surfaces provided by said non-resilient race members, and a plurality of non-resilient elements interposed between and in both lengthwise and circumferential rolling contact with the angularly disposed surfaces provided by the members of the floating support assembly and the non-resilient race members of the fixed support structure.

9. A vibration insulator comprising an annular fixed support structure having interiorly thereof an annular resilient member provided with angularly disposed annular surfaces extending in respectively opposite directions outwardly endwise of said fixed support structure, a plurality of non-resilient race members secured lengthwise of the angularly disposed surfaces of the said resilient member in substantially contiguous independent relation with respect to one another to provide substantially continuous non-resilient angular surfaces circumferentially of the angularly disposed surfaces of said resilient member, a floating support structure and including members providing angularly disposed annular surfaces correspondingly associated with said angularly disposed surfaces provided by said non-resilient race members fixed to the angularly disposed surfaces of said resilient member, a plurality of non-resilient elements interposed between and in both lengthwise and circumferential rolling contact with the angularly disposed surfaces provided by the members of the floating support assembly and the non-resilient race members of the fixed support structure, and means to vary the spacing between the angularly surfaced members of the floating support assembly in an axial direction to vary a static compression exerted thereby through said non-resilient elements and race members upon the annular resilient member of the fixed support structure.

10. A vibration insulator comprising an annular fixed support structure having interiorly thereof an annular resilient member provided with angularly disposed annular surfaces extending in respectively opposite directions outwardly endwise of said fixed support structure, a plurality of non-resilient race members secured lengthwise of the angularly disposed surfaces of the said resilient member in substantially contiguous independent relation with respect to one another to provide substantially continuous non-resilient angular surfaces circumferentially of the angularly disposed surfaces of said resilient member, a floating support assembly disposed substantially coaxial within said annular fixed support structure and including members providing angularly disposed annular surfaces correspondingly associated with said angularly disposed surfaces provided by said non-resilient race members fixed to the angularly disposed surfaces of said resilient member, a plurality of non-resilient elements interposed between and in both lengthwise and circumferential rolling contact with the angularly disposed surfaces provided by the members of the floating support assembly and the non-resilient race members of the fixed support structure, and a spacer sleeve having openings receiving said non-resilient elements operable to maintain the same in predetermined spaced relation with respect to one another both lengthwise and circumferentially of the fixed and floating supports.

11. A vibration insulator comprising an annular fixed support structure having interiorly thereof an annular resilient member provided with angularly disposed annular surfaces extending in respectively opposite directions outwardly endwise of said fixed support structure, a plurality of non-resilient race members secured lengthwise of the angularly disposed surfaces of the said resilient member in substantially contiguous independent relation with respect to one another to provide substantially continuous non-resilient angular surfaces circumferentially of the angularly disposed surfaces of said resilient member, a floating support assembly disposed substantially coaxial within said annular fixed support structure and including members providing angularly disposed annular surfaces correspondingly associated with said angularly disposed surfaces provided by said non-resilient race members fixed to the angularly disposed surfaces of said resilient member, a plurality of non-resilient elements interposed between and in both lengthwise and circumferential rolling contact with the angularly disposed surfaces provided by the members of the floating support assembly and the non-resilient race members of the fixed support structure, a spacer sleeve having openings receiving said non-resilient elements and operable to maintain the same in predetermined spaced relation with respect to one another both lengthwise and circumferentially of the fixed and floating supports, and means to vary the spacing between the angularly surfaced members of the floating support assembly in an axial direction to vary a static compression exerted thereby through said non-resilient elements and race members upon the annular resilient member of the fixed support structure.

12. A vibration insulator comprising an annular fixed support structure having interiorly thereof an annular resilient member providing at least one angularly disposed annular surface extending substantially lengthwise of the fixed support structure, a floating support assembly disposed substantially coaxial within said annular fixed support structure and having at least one angularly disposed annular surface correspondingly associated with said angularly disposed surface of the resilient member of the fixed support structure, and a plurality of non-resilient elements interposed between and in rolling contact with the angularly disposed surfaces of the floating support and the fixed support structure.

13. A vibration insulator comprising an annular fixed support structure having interiorly thereof an annular resilient member providing at least one angularly disposed annular surface extending substantially lengthwise of the fixed support structure, a floating support assembly disposed substantially coaxial within said annular fixed support structure and having at least one angularly disposed surface of the resilient member of the fixed support structure, a plurality of non-resilient elements interposed between and in rolling contact with the angularly disposed surfaces of the floating support and the fixed support structure, and spacer means associated with said non-resilient elements to maintain the same in predetermined spaced relation with respect to one another.

14. A vibration insulator comprising an annular fixed support structure having interiorly thereof an annular resilient member providing at least one angularly disposed annular surface extending substantially lengthwise of the fixed support structure, a floating support assembly disposed substantially coaxial within said annular fixed support structure and having at least one angularly disposed annular surface correspondingly associated with said angularly disposed surface of the resilient member of the fixed support structure, a plurality of non-resilient elements interposed between and in rolling contact with the angularly disposed surfaces of the floating support and the fixed support structure, and a spacer sleeve having openings receiving said non-resilient elements operable to maintain the same in predetermined spaced relation with respect to one another both lengthwise and circumferentially of the fixed and floating supports.

NICHOLAS IVANOVIC.

REFERENCES CITED

The following references are of record in the file of this patent:

UNITED STATES PATENTS

| Number | Name | Date |
|---|---|---|
| 758,457 | Macfarlane | Apr. 26, 1904 |
| 1,815,442 | Masury | July 21, 1931 |
| 1,892,065 | Markey | Dec. 27, 1932 |

FOREIGN PATENTS

| Number | Country | Date |
|---|---|---|
| 466,354 | Great Britain | May 26, 1937 |